July 2, 1946.  W. D. HERSHBERGER  2,403,278
CATHODE RAY SWEEP CIRCUIT
Filed June 25, 1941

Inventor
William D. Hershberger
By
Attorney

Patented July 2, 1946

2,403,278

UNITED STATES PATENT OFFICE 2,403,278

CATHODE-RAY SWEEP CIRCUIT

William D. Hershberger, Haddonfield, N. J., assignor to Radio Corporation of America, a corporation of Delaware Application June 25, 1941, Serial No. 399,608

8 Claims. (Cl. 315—24)

This invention relates to an improvement in cathode ray sweep circuits and particularly to a sweep circuit in which the cathode ray is swept alternately over concentric paths bearing a selectable phase relation to each other.

In a copending application Serial No. 358,462, filed September 26, 1940, for Sweep circuit generator for cathode ray tubes, applicant has disclosed and claimed a sweep circuit generator in which the generated voltages alternately sweep the cathode ray in concentric paths. The one path may form a main scale; the other path a vernier scale. The two sweep voltages may be so chosen, with respect to time, that any desired ratio may be obtained.

The present invention is an improvement over that described in the said copending application in that not only are the two circular scales alternately swept by the cathode ray in a predetermined time ratio, but means are provided for selecting any portion of scale corresponding to the slower moving sweep and for expanding the selected portion into the faster moving sweep or vernier scale.

It is one of the objects of the instant invention to provide improved means for generating voltages for the main and vernier sweeps of a cathode ray tube and for adjusting the effective phasic relation of said voltages. Another object is to provide means for establishing a main circular sweep in a cathode ray tube and a vernier circular sweep bearing a predetermined relationship to said main sweep. Another object is to provide means for sweeping a cathode ray over concentric circular paths at different rates and for making the faster sweep correspond to a predetermined and selectable portion of the slower sweep.

Figure 1:
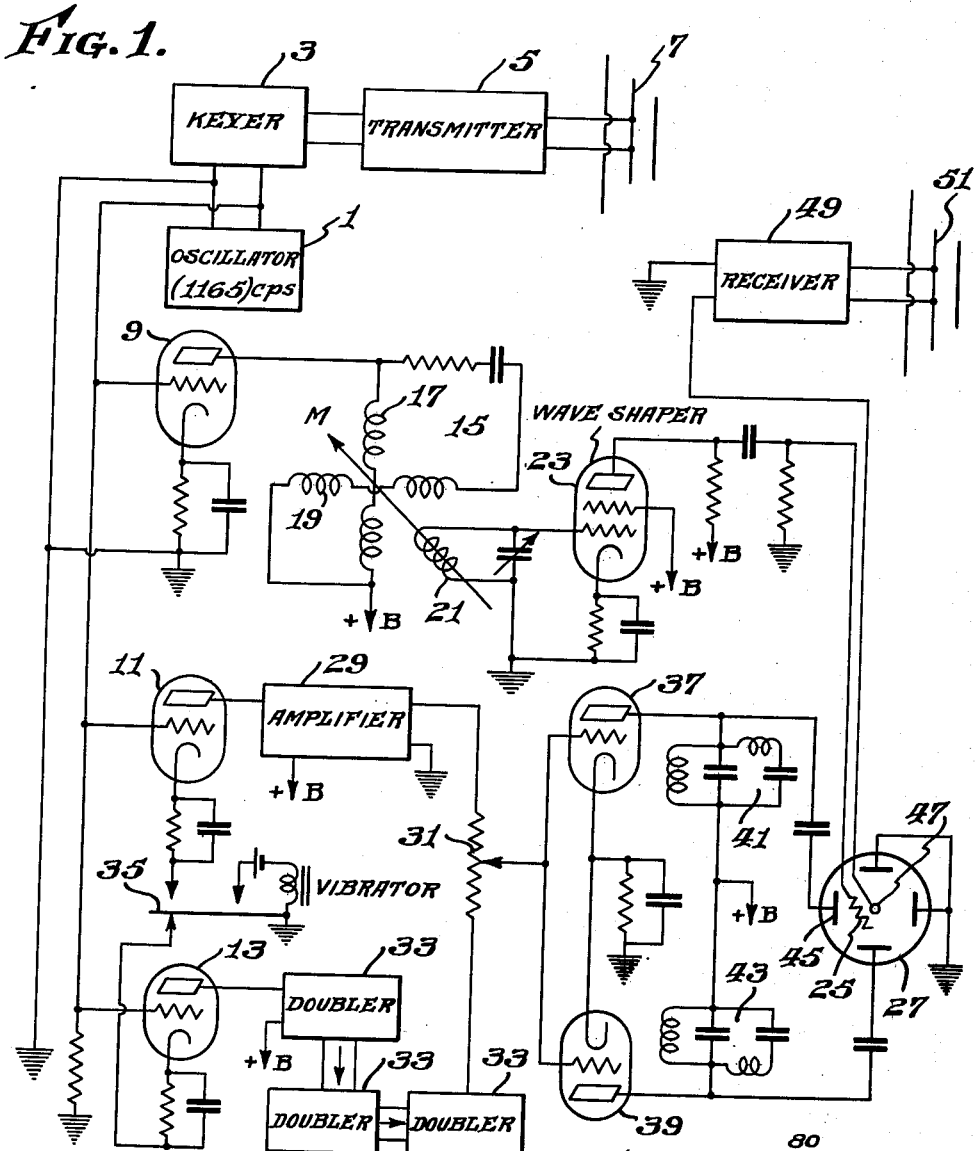
Figure 2A:
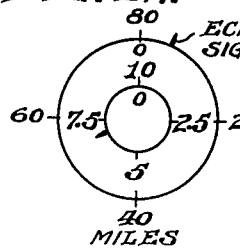
Figure 2B:
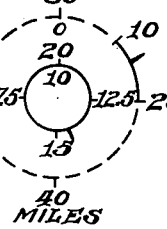
Figure 2C:

The invention will be described by referring to the accompanying drawing in which Figure 1 is a schematic circuit diagram of one embodiment of the invention, and Figures 2A, 2B and 2C are illustrations of the sweeps obtainable according to the invention.

Referring to Fig. 1, an oscillator 1 is connected to a keyer 3 which controls a pulse transmitter 5. The energy from the transmitter is applied to an antenna system 7 which may be directive. The oscillator is also connected to three amplifiers 9, 11, 13 in parallel with a grid resistor. The first amplifier 9 is connected to an adjustable phasing circuit 15, which includes a pair of fixed windings 17, 19 and a rotatable winding 21. The rotatable winding, which is preferably tuned, is connected to a wave shaper tube 23. The wave shaper tube converts the alternating current from the oscillator into a current of square or distorted wave form and of a phase determined by the phasing circuit. The resulting square wave form voltage is applied to a grid 25 or other control electrode of a cathode ray tube 27 to vary the cathode ray as hereinafter described.

The second amplifier 11 is connected through another amplifier 29 (which may be omitted when additional gain is not required) to a fixed terminal of a potentiometer 31. The third amplifier is connected through frequency multiplier circuits 33—in the present arrangement three doublers—to the other fixed terminal of the potentiometer 31. The cathodes of the second and third amplifiers are grounded alternately by a vibrator 35 which operates at a very much lower frequency than the oscillator 1 and preferably at a rate which will not cause flicker. Thus, the second and third amplifiers alternately apply currents from the oscillator to the potentiometer. While the second amplifier does not alter the oscillator frequency, the third amplifier increases the frequency so that it bears a predetermined ratio to the original frequency.

The currents of original and multiplied frequencies in the potentiometer 31 are applied through vacuum tubes 37, 39 to networks 41 and 43, respectively. The details of the networks are set forth in the above-mentioned copending application. It is sufficient to state that one network is inductively reactive to the currents of both frequencies and the other network is capacitively reactive to the currents so that two phase currents (of first one frequency, then the other frequency) are applied to the deflecting electrodes 45 of the cathode ray tube. These two two-phase currents alternately rotate the cathode ray to form circular traces. The radii of the traces may be adjusted by an appropriate setting of the movable arm of the potentiometer 31.

The cathode ray tube 27 also includes a radial deflecting electrode 47 which is connected to the output of a pulse echo receiver 49. The receiver may be connected to the directive antenna 7 or a separate antenna 51 which preferably has the same directivity as the transmitting antenna 7. The received signals, after amplification and detection, deflect the cathode ray along a radial line so that the distance of a pulse reflecting object may be indicated on the cathode ray tube provided the traces or tube screen are properly calibrated. It should be understood that the trace rotating at the lower frequency forms the main scale and the trace rotating at the higher frequency forms the vernier scale. In the present arrangement, the scales bear a one-to-eight ratio because the selected frequencies bear that ratio.

If the system were operated with the first amplifier omitted, the scales would be calibrated as shown in Fig. 2A. For an initial oscillator frequency of 1165 cycles per second, the main scale would cover 0–80 miles and the vernier scale would cover 0–10 miles. If the system is operated with the first amplifier 9 adjusted to either block or dim the cathode ray trace at any predetermined phase of the initial frequency cycle, the trace will then represent a selected portion of the scale. For example, as shown in Fig. 2B, the broken lines represent a dim trace and the solid lines represent a trace from 10 to 20 miles on the longer scale and the corresponding distance on the shorter scale. Fig. 2C represents a scale of 40 to 50 miles and a corresponding vernier scale.

The invention makes it possible for the operator of a pulse echo system to examine the coarser scale for pulse echo signals, and then to select any given range or distance and to apply the vernier scale to examine the echo signals from that range. The described arrangement merely requires the operator's adjusting the phasing device 15 by means of which the trace is blanked or dimmed for all but the desired distances. If this were not done, the vernier scale would begin to repeat the echoes from distances in excess of its maximum range and it would be difficult to identify the distances corresponding to a plurality of reflections. While the cathode ray sweep circuits have been described in connection with a pulse echo system, with which they are especially useful, the invention is not limited in its use to pulse echo measurement.

I claim as my invention:

1. A sweep circuit generator including in combination a source of alternating current, a source of signals, a cathode ray tube including ray lateral deflecting and intensity controlling elements and a signal radial deflecting electrode, means for adjusting the phase of said alternating current, means for applying the thus phase-adjusted current to said intensity controlling element, means for splitting the phase of said source of alternating current, means for changing the frequency of said source, means for splitting the phase of said changed frequency current, means for selectively applying to said ray lateral deflecting elements said split-phase voltages of desired frequency to produce circular movements of said cathode ray, and means for applying said signals to said radial deflecting electrode to produce radial deflection of said circular cathode ray movements.

2. A sweep circuit generator including in combination a source of alternating current, a source of signals, a cathode ray tube including ray lateral deflecting and intensity controlling elements and a signal radial deflecting electrode, means for adjusting the phase of said alternating current, means for applying the thus phase-adjusted current to said intensity controlling element, means for splitting the phase of said source of alternating current, means for changing the frequency of said source, means for splitting the phase of said changed frequency current, means for selectively applying said split-phase voltages of desired frequency to said ray lateral deflecting elements to produce circular movements of said cathode ray, means for varying the amplitude of said selectively applied voltages to make the radii of said circular movements different, and means for applying said signals to said radial deflecting electrode to produce radial deflection of said circular cathode ray movements.

3. A sweep circuit generator including a source of alternating current, a source of signals, a cathode ray tube including ray lateral deflecting and intensity controlling elements and a signal radial deflecting electrode, means for varying the phase of said alternating current, means for converting said alternating current into a square wave current, means for applying said square wave current to said intensity controlling element, means for altering the frequency of said alternating current, means for deriving two phase currents from said source of current and from said altered frequency current, means for selectively applying said two two-phase currents to said lateral deflecting elements to produce two circular traces of said cathode ray, and means for applying said signals to said radial deflecting electrode to produce radial deflection of said circular cathode ray traces.

4. A sweep circuit generator including a source of alternating current, a source of signals, a cathode ray tube including ray lateral deflecting and intensity controlling elements and a signal input radial deflecting electrode, means for varying the phase of said source of current, means for deriving from the thus phased current a current of different wave form, means for applying said current of different wave form to said intensity controlling electrode, means for deriving from said current a first two-phase current, means for obtaining a current of a different frequency from said source, means for deriving from said current of different frequency a second two-phase current, means for applying said two-phase currents alternately to said deflecting elements to produce a pair of circular movements of said ray, and means for applying said signals to said radial deflecting electrode to produce radial deflection of said circular cathode ray movements.

5. A sweep circuit generator including a source of alternating current, a source of signals, a cathode ray tube including ray lateral deflecting and intensity controlling elements and a signal input radial deflecting electrode, means for varying the phase of said source of current, means for deriving from the thus phased current a current of different wave form, means for applying said current of different wave from to said intensity controlling electrode, means for deriving from said current source a first two-phase current, means for increasing the frequency of the currents from said source, means for deriving from said current of increased frequency a second two-phase current, means for applying said two-phase currents alternately to said deflecting elements to produce a pair of circular movements of said ray, and means for applying said signals to said radial deflecting electrode to produce radial deflection of said circular cathode ray movements.

6. A sweep circuit generator including a source of alternating current, a source of signals, a cathode ray tube including ray lateral deflecting and intensity controlling elements and a signal input radial deflecting electrode, means for varying the phase of said source of current, means for deriving from the thus phased current a current of different wave form, means for applying said current of different wave form to said intensity controlling electrode, means for deriving from said current source a first two-phase current, means for increasing the frequency of the currents from said alternating source, means for deriving from said current of increased frequency a second two-phase current having an amplitude differing from said first two-phase current, means for applying said two-phase currents alternately to said lateral deflecting elements to produce a pair of circular movements of said ray, and means for applying said signals to said signal electrode to produce radial deflection of said circular cathode ray movement.

7. A generator according to claim 4 including means for making the relative amplitude of said two phase currents different so that said circular movements have different radii.

8. A generator according to claim 5 including means for making the relative amplitudes of said two phase currents different so that said circular movements have different radii.

WILLIAM D. HERSHBERGER.